US012649260B2

(12) United States Patent
Titze et al.

(10) Patent No.: US 12,649,260 B2
(45) Date of Patent: Jun. 9, 2026

(54) METHOD AND DEVICE FOR IMPREGNATING AT LEAST ONE FIBRE MATERIAL

(71) Applicant: DEUTSCHES ZENTRUM FÜR LUFT- UND RAUMFAHRT E.V., Bonn-Oberkassel (DE)

(72) Inventors: Maik Titze, Hannover (DE); Matteo Rege, Braunschweig (DE)

(73) Assignee: DEUTSCHES ZENTRUM FÜR LUFT- UND RAUMFAHRT E.V., Bonn-Oberkassel (DE)

( * ) Notice: Subject to any disclaimer, the term of this patent is extended or adjusted under 35 U.S.C. 154(b) by 339 days.

(21) Appl. No.: 18/005,481

(22) PCT Filed: Jul. 6, 2021

(86) PCT No.: PCT/EP2021/068658
§ 371 (c)(1),
(2) Date: Nov. 2, 2023

(87) PCT Pub. No.: WO2022/013011
PCT Pub. Date: Jan. 20, 2022

(65) Prior Publication Data
US 2024/0051184 A1 Feb. 15, 2024

(30) Foreign Application Priority Data

Jul. 15, 2020 (DE) ..................... 10 2020 118 703.3

(51) Int. Cl.
*B29B 15/12* (2006.01)
*B33Y 70/10* (2020.01)
*D06B 5/04* (2006.01)

(52) U.S. Cl.
CPC ............ *B29B 15/122* (2013.01); *B33Y 70/10* (2020.01); *D06B 5/04* (2013.01)

(58) Field of Classification Search
None
See application file for complete search history.

(56) References Cited

U.S. PATENT DOCUMENTS

| | | | |
|---|---|---|---|
| 4,957,422 A | 9/1990 | Glemet et al. | |
| 5,879,602 A | * 3/1999 | Scheuring | B29C 48/865 425/114 |

(Continued)

FOREIGN PATENT DOCUMENTS

| | | |
|---|---|---|
| CN | 210880982 U | 6/2020 |
| DE | 3835574 A1 | 4/1990 |

(Continued)

*Primary Examiner* — Charles Capozzi
(74) *Attorney, Agent, or Firm* — WCF IP

(57) ABSTRACT

The invention relates to an impregnating device for impregnating at least one quasi-endless fibre material with a plastic material which is melted at a corresponding process temperature, having at least one fibre supply channel a having a fibre feed to supply the quasi-endless fibre material to the impregnating device, and at least one plastic supply channel having a plastic feed separate from the fibre feed to supply the plastic material to the impregnating device separately from the fibre material, the at least one fibre supply channel and the at least one plastic supply channel being separate at least in some portions and opening out into a common impregnation cavity to impregnate the quasi-endless fibre material with the supplied and melted plastic material, characterised in that the impregnating device has a back-flow-blocking region in which die fibre supply channel has, at least in some portions, an S-shaped profile which is formed by two curves with opposing curve directions, between which the fibre supply channel is joined with the at least one plastic supply channel so that a coalition channel portion is then formed.

13 Claims, 9 Drawing Sheets

(56) References Cited

U.S. PATENT DOCUMENTS

| 2002/0108699 | A1* | 8/2002 | Cofer | ...................... | H01B 1/24 |
| | | | | | 428/292.1 |
| 2019/0184606 | A1* | 6/2019 | Huang | ................... | B29C 70/50 |

FOREIGN PATENT DOCUMENTS

| DE | 102016219289 | A1 | | 4/2018 | | |
| EP | 0364828 | A2 | | 4/1990 | | |
| EP | 0635542 | A2 | * | 7/1994 | .............. | C08K 7/02 |
| EP | 1421838 | A1 | | 5/2004 | | |
| EP | 3498446 | A1 | | 6/2019 | | |
| EP | 3698954 | A2 | | 8/2020 | | |
| WO | 2002030657 | A1 | | 4/2002 | | |

* cited by examiner

METHOD AND DEVICE FOR IMPREGNATING AT LEAST ONE FIBRE MATERIAL

The invention relates to an impregnation apparatus for impregnating at least one quasi-continuous fiber material with a plastics material. The invention relates to a method to this end.

On account of the particular weight-specific strength and rigidity, fiber composite materials have become virtually indispensable as modern materials. However, the combination of fiber material and plastics material in 3D printing also opens up new possibilities in the production of complex structures without having to resort to isotropic materials. Both in the production of fiber composite components from fiber composite materials and in 3D printing with fiber reinforcement, use is very frequently made of fiber rovings, which are a kind of fiber bundle and are formed from a multiplicity of continuous fibers, also referred to as filaments. Besides additive manufacturing processes (for example, 3D printing) for the production of fiber-reinforced components, there is currently a range of other different manufacturing methods for producing fiber composite components. These include, inter alia, tape laying, thermoforming, winding, pultrusion, autoclave and infusion processes or overmolding.

In particular in the case of continuous or intermittently continuous processes, such as for example the extrusion of continuous fiber-reinforced semifinished products or the 3D printing (FFF, DED) of continuous fiber-reinforced structures, the high-quality and continuous introduction of the rovings into the plastic constitutes a major challenge. The fiber bundles (for example carbon fibers or glass fibers) often consist of several 1000 to 10 000 individual fibers having a diameter between 3 $\mu$m to 8 $\mu$m and have to be impregnated with the liquid plastic (completely penetrated/each individual fiber encased) and then consolidated (geometric final shape if possible without foreign body and air inclusions by solidification of the plastic).

Hauke Prüß, Thomas Vietor: "Neue Gestaltungsfreiheiten durch 3D-gedruckte Faser-Kunststoff-Verbunde" [New Design Freedoms Through 3D-Printed Fiber-Plastic Composites], Forum für Rapid Technologie [Forum for Rapid Technology], Edition December 2015, discloses a 3D printhead that is fed centrally with a quasi-continuous fiber material. The 3D printhead is in addition fed with a plastics material with the aid of two feed channels, with fiber material and plastic material entering into a common mixing chamber. The fiber material fed through is wetted with the plastics material here, with the material mixture thus formed being discharged. As a result, it is possible to develop almost any desired structures with an integrated load thread.

Supplementing this, DE 10 2017 124 352 A1 discloses a system for producing 3-dimensional structures with a 3D printhead in which 3 or more feed channels are provided which are arranged around an axial course of the feed channel for the fiber material, as a result of which in particular a fiber-plastics mixture can be 3D printed with various plastics materials.

Furthermore, subsequently published DE 10 2019 106 355.8 discloses an impregnation apparatus for producing continuous fiber-reinforced semifinished products with plastics impregnation, in which the quasi-continuous fiber material and the plastics material are separately fed to the impregnation apparatus. In a mixing chamber, the quasi-continuous fiber material is then drawn through the pressurized plastics material, with sound energy being introduced into the plastics material of the mixing chamber by means of a sonotrode for the purpose of improved impregnation.

The disadvantage of these known 3D printheads and impregnation apparatuses resides in the fact that the feeding of the (in particular thermoplastic) plastic into the mixing chamber results in the generation of a pressure within the mixing chamber, which also results in the molten plastic being pressed into the feed channel for the fiber material and rising up therein, and hence moving counter to the conveying direction of the quasi-continuous fiber material. In the worst case, this can lead to the plastic emerging at the entry point at which the fiber material is introduced into the impregnation apparatus into the feed channel provided for this purpose, and hence to undesired leakage occurring. However, there is also the risk that, as a result of rising within the feed channel, the molten plastic will cool and then solidify within the fiber feed channel, which ultimately leads to an interruption in the conveying of the fiber material and thus to the stoppage of the process.

DE 10 2017 124 353 A1, similarly to DE 10 2017 124 352 A1, discloses a system for producing 3-dimensional structures with a 3D printhead, where here it is additionally provided that a positive pressure source is connected at the inlet of the material feed for the fiber material in order thus to apply a positive pressure at the inlet of the material feed for the fiber material. This positive pressure is intended to prevent the plastics material from rising up into the fiber feed channel and thus causing the problems described above. Disadvantages here are the high system complexity and limitation of the mobility of the 3D printhead, in particular at high deposition speed. This is because the fiber material has to be accommodated, together with its fiber magazine, in a closed pressure vessel in order to obtain a system which is closed overall. In addition, the use of compressed air increases the risk of air inclusions forming in the matrix material, which then lead to defects within the component.

EP 0 712 716 A1 furthermore discloses a method and an apparatus the impregnating continuous fibers or fiber bundles with a molten thermoplastic, wherein the fibers or rovings pass through an impregnation zone which has the shape of a damped wave. This is intended to improve the spreading of the roving and hence the impregnation result. A split die is additionally provided in order to improve the insertion of the rovings and the cleaning of the die. However, even with this apparatus it is not possible to prevent the plastics material fed into the die from emerging at the inlet of the fiber material feed on account of the feed pressure.

Especially when impregnating rovings (fiber bundles) with high-viscosity plastics, such as for example thermoplastics, elevated melt pressures are required for efficient impregnation and for process control. It is a particular challenge, in particular when continuously introducing fiber bundles into a pressurized liquid plastic, that as far as possible no liquid plastic rises up into the fiber feed channel and later blocks it. A high-viscosity plastics material is understood here in particular to mean a plastics material that at a determined process temperature has a viscosity of substantially more than 8000 mPas (millipascal-seconds). From these can be distinguished low-viscosity plastics materials, which have a viscosity of up to 300 mPas. Between 300 mPas and 8000 mPas, reference is made to a medium viscosity. Thermoplastics, as can frequently be encountered in hybrid 3D printing, often have a viscosity of 300 Pas to 10 000 Pas. Depending on how intensely the plastics material is sheared when it is brought into contact with the fiber, the viscosity may also be well below the usual zero viscosity (3000-10.000 Pas). The determined process temperature is understood here to mean that temperature of the plastics material at which the plastics material is used for impregnation. In the case of thermoplastics, this is in particular that temperature at which the plastics material is molten and thus can correspondingly impregnate the fiber bundle.

A further challenge in the continuous impregnation of rovings by means of an automated impregnation apparatus is the insertion of the fiber bundle at the very beginning of the process. The feed channel provided for the fiber material must have the capability of threading the fiber material into the impregnation apparatus at the inlet point.

It is therefore an object of the present invention to specify an improved apparatus with which a fiber material (in particular rovings) can be continuously impregnated with a plastics material. It is also an object of the present invention to specify an improved method to this end.

The object is achieved according to the invention with the impregnation apparatus mentioned in the introduction and having the features of patent claim 1. Advantageous embodiments of the impregnation apparatus can be found in the corresponding dependent claims.

According to claim 1, an impregnation apparatus for impregnating at least one quasi-continuous fiber material is claimed, wherein the quasi-continuous fiber material is impregnated with a plastics material which has been melted at an appropriate process temperature.

The fiber material may in particular be rovings or fiber bundles that consist of a multiplicity of individual quasi-continuous fibers or filaments. The fiber material may for example be formed of carbon fibers or glass fibers. However, other fiber materials are of course also conceivable. The fiber material may in particular be that fiber material that is a constituent of a fiber composite material for producing a fiber composite component. In particular, these may be fiber materials that are used in additive or generative manufacturing processes, such as for example 3D printing using a 3D printing system.

The plastics material may be a thermoplastic or thermoset plastics material. The plastics material may in particular be a high viscosity plastics material. It may in particular be a plastics material that is a constituent of a fiber composite material for producing a fiber composite component. Such plastics materials are also referred to as matrix materials.

The impregnation apparatus according to the invention has, generically, at least one fiber feed channel with a fiber introduction means in order to feed the quasi-continuous fiber material to the impregnation apparatus. Furthermore, the impregnation apparatus has, generically, at least one plastics feed channel with a plastics introduction means that is separate from the fiber introduction means, in order to feed the required plastics material, with which the fiber material is intended to be impregnated by means of the impregnation apparatus, to the impregnation apparatus separately from the fiber material. The plastics introduction means of the plastics feed channel may have a closure apparatus in order to connect the impregnation apparatus to a reservoir vessel for the plastics material. By means of the fastening apparatus, an in particular flexible supply hose can be connected to the impregnation apparatus which is designed at the opposite end with the reservoir vessel and optionally with a pressure source for generating a conveyance pressure.

The at least one fiber feed channel and the at least one plastics feed channel are separate at least in sections in the impregnation apparatus. Both the fiber feed channel and the plastics feed channel then open into a common impregnation cavity in order to impregnate the quasi-continuous fiber material with the fed and melted plastics material. The impregnation is effected mainly and preferably completely in the impregnation cavity.

However, this does not preclude the fiber feed channel and the plastics feed channel from being guided upstream of the impregnation cavity in a common channel section, which then opens into the impregnation cavity. In this case, both the fiber feed channel and the plastics feed channel have a first section in which both feed channels are separate and at least one second section in which the fiber material and the plastics material are guided in a common channel section. In the second section, the fiber feed channel and the plastics feed channel are thus formed by a common channel.

According to the invention, it is now provided that the impregnation apparatus has a backflow-preventing region, in which the fiber feed channel at least in sections has an S-shaped course which is formed by two curvatures with opposite directions of curvature, between which the fiber feed channel is brought together with the at least one plastics feed channel, so that a common channel section is then formed.

This backflow-preventing region (S-shaped course of sections of the fiber feed channel) is preferably located in the remaining part of the impregnation apparatus and not in the fiber introduction means or in the region of the impregnation cavity. As a result of the S-shaped course, the fiber material lies in the respective radius of curvature of the S-shaped course, where the direction of curvature changes on account of the S-shaped course and thus the fiber material during transport through the fiber feed channel (conveying direction, extrusion direction) bears once against a first inner side and once against an opposite second inner side.

As a result, the fiber material itself already forms a backflow prevention means since the fiber material on account of the change of sides always bears against an inner side and thus forms a natural backflow prevention means for the plastics material. It has been found that, on account of the continuous movement of the fiber material that acts in the conveying direction on the plastics material as the latter rises, the melt pressure counter to the conveying direction is reduced to such an extent that the plastics material cannot be pressed between the inner side of the fiber feed channel against which the fiber material bears and the fiber material itself. This is because, for the continuous conveying of the fiber material, a tensile stress is applied to the fiber material which causes the fiber material to be drawn through the feed channel and be pressed against the inner side of the fiber feed channel in the S-shaped course with a force that is greater than the counterforce produced by the rising plastics material.

It has accordingly surprisingly been found that a natural backflow prevention means thus formed by an S-shaped course can effectively prevent the fed plastics material from rising up into the fiber feed channel. As a result of the continuous conveying of the fiber material and the associated tensile stress on the fiber material, the pressurized plastics material cannot reach the section of the fiber feed channel that lies above (as seen in the conveying direction) the first curvature.

The continuous conveying of the fiber material moreover also prevents the plastics material, at the point at which the plastics feed channel meets the fiber feed channel, from penetrating into and through the fiber material conveyed past there, as a result of which the plastics material would break through the backflow prevention means. However, the continuous conveying of the fiber material prevents complete saturation at this point and thus ensures that the plastics material cannot overcome the backflow prevention means. Knowledge concerning this can, however, be used in a targeted manner to ensure partial preimpregnation of the fiber material without the latter being completely penetrated. This can improve the impregnation result.

Such an impregnation apparatus can be part of a system for printing quasi-continuous, plastic-impregnated fiber materials.

According to one embodiment, it is provided that the curvatures of the fiber feed channel are designed in such a way that the fiber material at the first curvature is guided with contact along a first inner side of the fiber feed channel and at the second curvature is guided with contact along a second inner side of the fiber feed channel opposite the first inner side.

According to one embodiment, it is provided that the at least one plastics feed channel opens into the fiber feed channel at the first inner side of the fiber feed channel between the first and second curvatures.

The plastics feed channel opens into the fiber feed channel at the inner side against which the fiber material bears at the first curvature located above (in relation to the conveying direction) the opening. Thus, starting from the opening into the fiber feed channel and counter to the conveying direction, the fiber feed channel is blocked by the fiber material.

According to one embodiment, it is provided that the impregnation apparatus has at least one heating device which is designed to control the temperature of the fiber material and/or the plastics material.

As a result of controlling the temperature of the plastics material, it remains at the process temperature in order to accelerate the impregnation process. By controlling the temperature of the fiber material, it is achieved that the process temperature remains constant or substantially constant even when the plastics material comes into contact with the fiber material and no negative properties develop as a result of the cooling of the plastics material on the fiber material.

According to one embodiment, it is provided that the heating device has an electrode arranged in the fiber feed channel at a position at which the fiber material is guided with contact along the electrode, wherein the heating device is configured to generate a flow of current in an electrically conductive fiber material by means of the electrode.

Such an electrode may preferably be arranged in a curvature, more precisely at the inner side of the curvature, in the fiber feed channel. For the sake of completeness, it should be mentioned that the heating device also has a counter electrode which likewise can be provided in the impregnation apparatus or else is arranged outside of the impregnation apparatus (for example fiber magazine or at the exit point from the impregnation apparatus). A flow of current in the electrically conductive fiber material is brought about between the electrode and the counter electrode, as a result of which the fiber material heats up in the manner of a resistance heater. The flow of current is brought about by applying an electrical voltage to the electrode and/or counter electrodes.

According to one embodiment, it is provided that the width of the fiber feed channel essentially corresponds to the width of the fiber material. As a result, the fiber feed channel in the region of the opening of the plastics feed channel can be blocked even better by the fiber material in order to prevent the plastics material from rising up.

According to one embodiment, it is provided that the fiber introduction means is a component which is separate from the rest of the impregnation apparatus and designed for detachable arrangement on the impregnation apparatus and which has at least two individual elements that can be brought from an open state into a closed state and that in the closed state form at least a portion of the fiber feed channel.

Accordingly, the fiber introduction means is a separate component which can be detachably arranged on the impregnation apparatus. The component can accordingly be brought from a non-installed state into an installed state and back again. The separate component can therefore be detachably installed on the impregnation apparatus and removed again. The open state here means a non-assembled or non-installed state, while the closed state means an assembled or installed state.

The fiber introduction means in the form of a component separate from the rest of the impregnation apparatus has at least two individual elements that can be brought from an open state into a closed state. In the closed state, the component can then be installed on the impregnation apparatus. In the open state, access to the interior of the section of the fiber feed channel formed by the fiber introduction means is possible. The individual elements may be in the form of separate elements that are physically assembled and brought into the closed state only when the fiber introduction means is installed on the impregnation apparatus. However, it is also conceivable for the individual elements to be connected to one another via a hinge device or pivoting device designed such that the individual elements can be brought from an open state into a closed state and back.

This additionally makes it possible to simplify the fiber introduction means when threading the fiber material into the impregnation apparatus at the start of the process and at the same time to prevent, in a process-reliable manner, the molten plastics material from rising up into and emerging from the fiber introduction means. As a result of the separate component that consists of a plurality of individual elements, the fiber introduction means can then be uninstalled from the impregnation apparatus, the fiber material can be inserted into the impregnation apparatus and then the inserted fiber material can be surrounded by the fiber introduction means at the beginning when the fiber introduction means is assembled and installed on the impregnation apparatus.

This is particularly advantageous in particular when the section of the fiber feed channel formed by the fiber introduction means in the closed state has a cross-sectional shape that essentially corresponds to the cross-sectional shape of the fiber material to be fed. In this case, this section of the fiber feed channel has in particular a cross-sectional area which is only marginally larger than the cross-sectional area formed by the fiber material. It has been found to be advantageous if the cross-sectional area of the fiber feed channel section of the fiber introduction means transverse to the conveying direction of the fiber material corresponds to a maximum of 30 times (preferably a maximum of 20 times and particularly preferably a maximum of 10 times) the theoretical cross-sectional area of the fiber bundle or the fiber material. The theoretical cross-sectional area of a fiber bundle is the sum of the cross-sectional area of the individual fibers, which results from the number of individual fibers and the cross-sectional area of an individual fiber ply or an individual filament.

The greatly reduced cross-sectional area transverse to the conveying direction reliably prevents the plastics material fed under pressure into the impregnation apparatus from rising, with threading in of a roving being possible without any problems due to the modular structure of the fiber introduction means.

According to one embodiment, it is provided that the parting plane of the individual elements of the fiber introduction means lies in the axis of the section of the fiber feed channel formed by the fiber introduction means. In the open state of the fiber introduction means, a part of the inner side of the section of the fiber feed channel formed by the fiber introduction means is therefore present in each individual element. By assembling the individual elements in the closed state, the section of the fiber feed channel is then formed by the fiber introduction means. This makes it easier in particular to load the impregnation apparatus with the fiber material and to clean relevant components.

According to one embodiment, it is provided that a closure device is provided which is designed for the form-and/or force-fitting arrangement of the individual elements of the fiber introduction means on the impregnation apparatus. Such a closure device may have a centering device (for example by means of latching elements and/or tongue and groove elements) into which the individual elements are inserted, with the individual elements being able to be fixed on the impregnation apparatus by means of a union nut. Also conceivable are clamping devices with which the individual elements are pressed together. The closure device has the further advantage that the section of the fiber feed channel formed by the fiber introduction means is centered at the mechanical interface in relation to the adjoining section of the fiber feed channel in the rest of the impregnation apparatus, meaning that the fiber material can be continuously conveyed without problems from the first section of the fiber feed channel (in the fiber introduction means) into the second section of the fiber feed channel (in the rest of the impregnation apparatus, the main assembly).

According to one embodiment, it is provided that the cross-sectional area of the section formed by the fiber introduction means, as first section of the fiber feed channel, is smaller than a second section of the fiber feed channel that directly adjoins the fiber introduction means in the rest of the impregnation apparatus. The fiber introduction means thus has a narrower section of a fiber feed channel than the rest of the impregnation apparatus, which makes it possible to particularly easily thread the fiber material into the impregnation apparatus, while a plastics material can in a process-reliable manner be prevented from rising up into the fiber feed channel of the fiber introduction means.

According to one embodiment, it is provided that the section formed by the fiber introduction means is essentially linear, undulating or double-S-shaped in course or in that the first section formed by the fiber introduction means has at least one curvature. The cross-sectional shape (transverse to the fiber guide) is preferably rectangular (advantageous if the fiber material (roving) is fed already spread open) or round or oval (advantageous if the fiber material has not been spread open beforehand). However, other cross-sectional shapes are also conceivable, such as for example multiply curved.

In the case of a linear course of the section of the fiber feed channel formed by the fiber introduction means, the fiber material is guided particularly gently through the fiber introduction means, since the friction of the fiber material on the inner wall of the fiber feed channel is minimized.

In the case of an undulating course, in contrast, the friction of the fiber material on the inner wall of the fiber feed channel is increased, but as a result of the changing directions of the fiber guide both a spreading of the fiber material can be promoted, which improves the impregnation of the fiber material with the plastics material, and the plastics material can be prevented even better from rising up into the section of the fiber feed channel formed by the fiber introduction means. In particular in the case of a double-S-shaped course, it can be achieved that the fiber material itself always forms a barrier to the further rising up of the liquid plastics material. This is because, as a result of the change in direction of the curvatures in a double-S-shaped course, the fiber material bears at least once against the first inner side and at least once against the opposite second inner side, so that the plastics material is prevented from rising up further by the fiber material itself.

In connection with an undulating or double-S-shaped course of the fiber feed channel in the fiber introduction means and additionally, optionally, also a sharply tapered cross section of this section, it is possible to prevent the plastics material from being able to rise up counter to the conveying direction and negatively affecting the impregnation process, even at high melt pressures. This offers further protection even at high melt pressures.

According to one embodiment, it is provided to this end that the backflow-preventing region is arranged upstream of the impregnation cavity in the conveying direction of the fiber material.

According to one embodiment, it is provided to this end that the backflow-preventing region is provided in a backflow-preventing component which is detachably fastened or fastenable to an impregnation component having the impregnation cavity, wherein the fiber introduction means is arranged or arrangeable as a separate component on the backflow-preventing component. As a result, the entire impregnation apparatus can be constructed in a modular manner.

The conveying speed of the fiber material can be between 0.3 m/m in and up to 50 m/m in (preferably 3 m/m in to 15 m/m in). The conveying speed of the plastics material can be identical or can differ (up to 30%) from the conveying speed of the fiber material. The fiber bundles made of carbon fiber, glass fiber, natural fiber, etc. as a roving can comprise 1000 to 50 000 individual fibers. However, it is also conceivable for several fiber bundles to be fed simultaneously or one after the other via a plurality of feed units. It is also conceivable for a plurality of fiber bundles to be spread open and fed as a broad tape. The fiber bundles can be spread open, in particular spread flat, by the impregnation apparatus upstream of the impregnation cavity. To this end, the impregnation apparatus has appropriate spreading elements. It is advantageous for the temperature of the fiber bundle to be adjusted to a temperature of between 50° C. to 1000° C. (150° C. to 500° C.) in advance or by means of the heating device of the impregnation apparatus. The actual process temperature depends on the plastic used and in particular on the rheological properties of the liquid plastic. The fiber bundles may be pretensioned with a force of more than 5 newtons and below the critical tensile force at which damage to the fibers would occur, and be continuously conveyed through the impregnation apparatus. The pressure of the liquid plastic (melt pressure) can be between 5 bar and 1000 bar (preferably between 5 bar and 400 bar).

With the aid of the impregnation apparatus, it is possible to achieve a fiber volume content of between 30% and 80% in the final semifinished product or the extruded profile/strand (3D printing) after emerging from a nozzle.

The impregnation apparatus has an exit or exit channel downstream of the impregnation cavity in the conveying direction, through which the impregnated fiber material is discharged. Here, a nozzle can be connected to the impregnation apparatus in order to extrude the impregnated fiber material (extrusion impregnation).

A further aspect of the present invention relates to a backflow-preventing component for use in an impregnation apparatus for impregnating a quasi-continuous fiber material with a plastics material, wherein the backflow-preventing component has at least one fiber feed channel with a fiber introduction means in order to feed the quasi-continuous fiber material, and has at least one plastics feed channel with a plastics introduction means that is separate from the fiber introduction means, in order to feed the plastics material separately from the fiber material, wherein the at least one fiber feed channel and the at least one plastics feed channel are separate at least in sections. The impregnation apparatus has a backflow-preventing region, in which the fiber feed channel at least in sections has an S-shaped course which is formed by two curvatures with opposite directions of curvature, between which the fiber feed channel is brought together with the at least one plastics feed channel, so that a common channel section is then formed.

The statements made with regard to the impregnation apparatus in the context of the features of the backflow-preventing component can correspondingly be applied to this aspect of the invention. This applies in particular to all features that are provided upstream of the impregnation cavity. In particular, the backflow-preventing component according to the invention does not have an impregnation cavity within the meaning of the present invention.

The object is also achieved according to the invention with the method of the type mentioned in the introduction, the method comprising the following steps:

providing an impregnation apparatus as claimed in any of claims 1 to 13, introducing the quasi-continuous fiber material into the provided impregnation apparatus, and continuously feeding the plastics material and the quasi-continuous fiber material into the impregnation cavity of the impregnation apparatus in order to impregnate the quasi-continuous fiber material with the plastics material, wherein in a backflow-preventing region provided in the impregnation apparatus the fiber material is guided through an S-shaped course of the fiber feed channel, wherein between the two curvatures of the S-shaped course the plastics material is pressed, through the plastics feed channel opening therebetween, into the common channel section.

The invention will be explained in more detail by way of example on the basis of the attached figures, In the figures, without restricting the generality:

Figure 1:
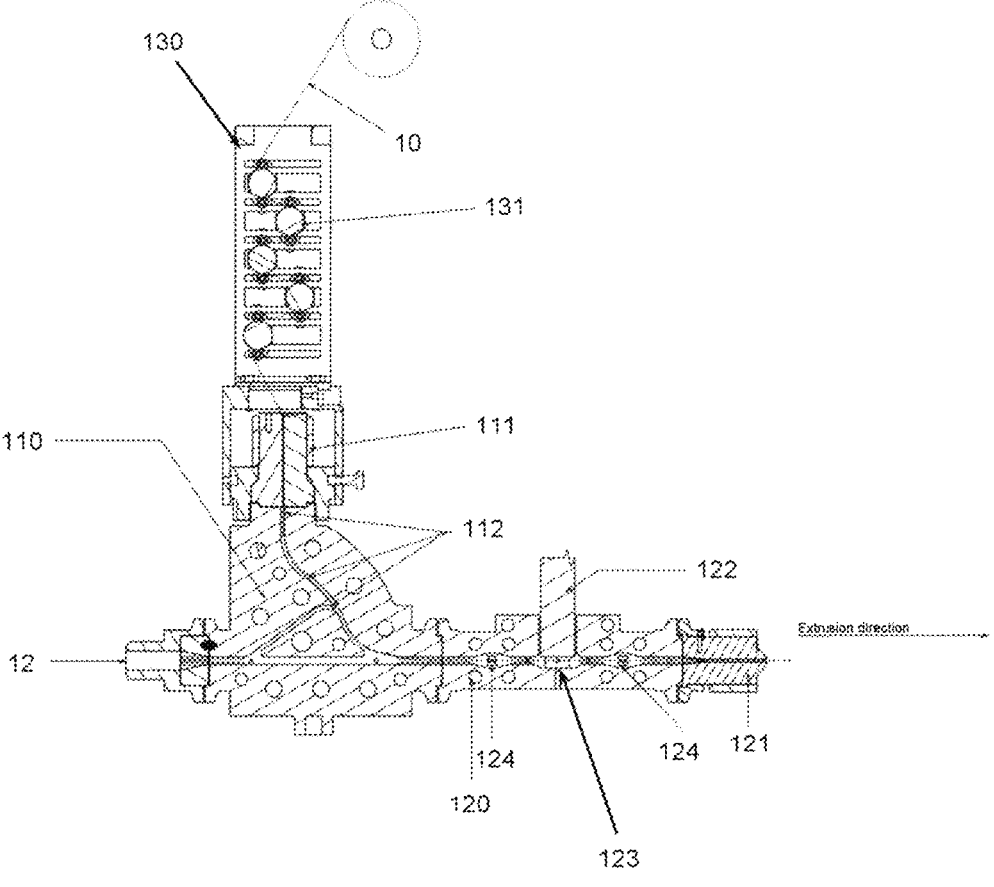
FIG. 1 shows an illustration of an impregnation apparatus according to the invention.

FIG. 1 shows a complete view of the impregnation apparatus 100 with a backflow-preventing component 110, an impregnation component 120 and a spreading component 130 for spreading open the fiber material 10 to be introduced.

The fiber material 10 (fiber bundle) situated in a fiber magazine is guided through the spreading component 130 which has a roller system 131 designed such that the fiber bundle is spread open. The fiber material 10 is then introduced into the backflow-preventing component 110. Into this backflow-preventing component 110 is furthermore fed a liquid plastic 12, which then merges with the fed fiber material 10 and is intended to completely impregnate the fiber material 10 in the impregnation component 120. The fiber material 10 impregnated with the plastic 12 is then extruded from a nozzle 121. The backflow-preventing component 110 has a plurality of backflow prevention means 112, as will be shown in more detail later. Situated at the upper end of the backflow-preventing component 110 in the region where the fiber material 12 is introduced into the backflow-preventing component 110 is the fiber introduction means 111, which will also be explained in detail later.

The impregnation component 120 contains an ultrasonic sonotrode 122 in order to apply sound energy to the plastics material 12 situated in the impregnation cavity 123. This is intended to improve the impregnation result. Positioning elements 124 are situated upstream and downstream of the impregnation cavity 123 so that the fiber material is guided along the ultrasonic sonotrode 122 at an exactly predetermined position in relation to the latter. The ultrasonic sonotrode 122 may have a duct through which the fiber material is guided.

The entire impregnation apparatus 100 has a modular construction, so that the individual constituents can be assembled as required. If, for example, an impregnation component 120 is required in which there is no ultrasonic sonotrode 122, the impregnation component 120 can simply be replaced with another component, provided the mechanical interfaces correspond to one another.

Figure 2:
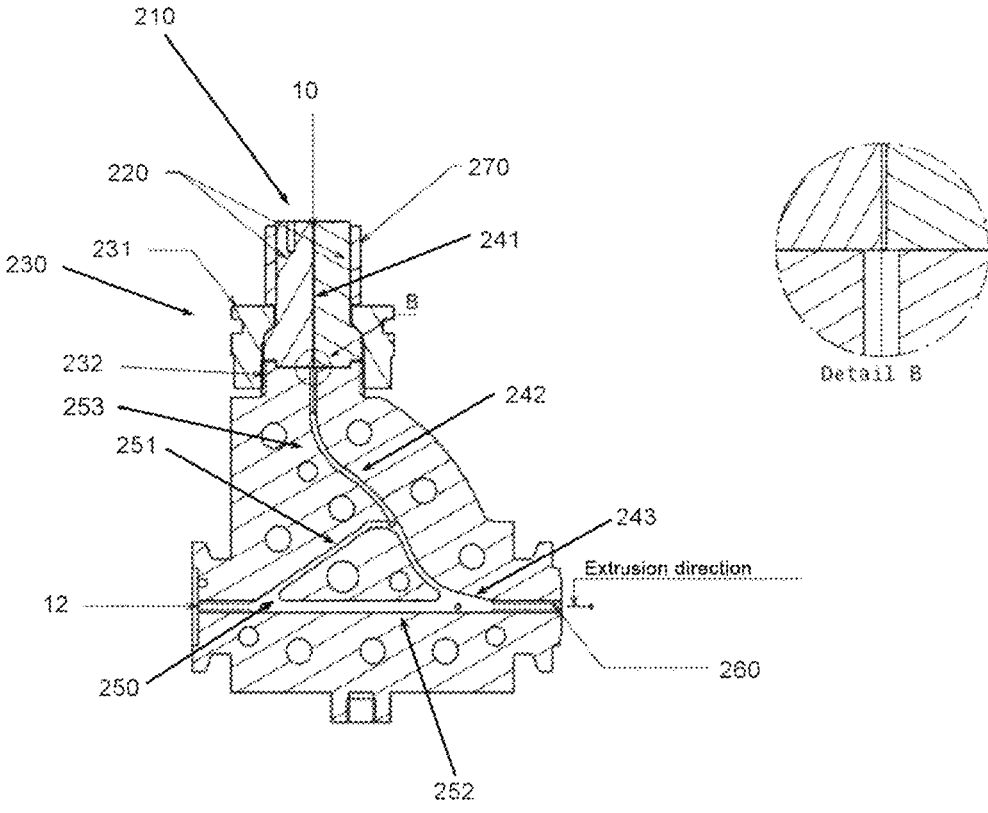
FIG. 2 shows an illustration of a backflow-preventing region.
Figure 3:
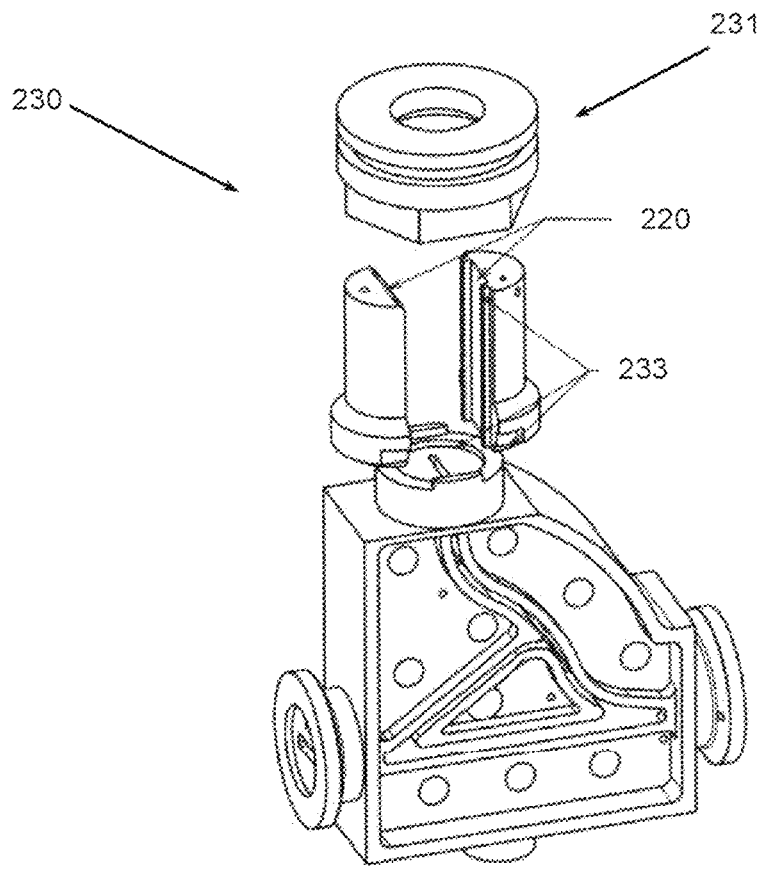
FIG. 3 shows an isometric illustration of the backflow-preventing component.

FIG. 2 shows in detail the backflow-preventing component 200 labeled 110 in FIG. 1. FIG. 3 shows an isometric view of this. In the region where the fiber material 10 is introduced, there is a fiber introduction means 210 which can be detachably arranged as a separate component on the backflow-preventing component 200. In the exemplary embodiment in FIGS. 2 and 3, the separate component of the fiber introduction means 210 has in each case two individual elements 220, which can be arranged on the backflow-preventing component 200 via a centering closure device 230. In the exemplary embodiment in FIG. 2, the individual elements 220 can be seen in a closed state on the backflow-preventing component 200, while in FIG. 3 the individual elements 220 can be seen in an open state.

The closure device 230 also includes a bracing element 231 in the form of a union nut, with which, in conjunction with a centering device 233 of the closure device 230, the individual elements 220 of the fiber introduction means 210 can be connected in a form- and/or force-fitting manner to the backflow-preventing component 200 in centered fashion. This can be done, for example, with the aid of a fine thread arranged on a collar of the backflow-preventing component 200. A conical inner shape of the bracing element 231, which interacts with a conical outer shape of the individual elements 220, allows the fiber introduction means to be arranged firmly on the backflow-preventing component 200.

At the same time, the half-shells are braced against one another. The angled surface creates a downward force (securing the individual elements on the component) and an inward force (radial, to press the individual elements together) by tightening the union nut.

Centering is understood here to mean that the channel outlet of the fiber introduction means 210 lies above the region of the channel inlet of the backflow-preventing component 200. The individual elements 220 have protrusions and depressions (in the manner of a tongue and groove connection) which engage in one another and fix the individual elements in relation to one another. In addition, a corresponding fit is provided on the backflow-preventing component 200, into which the individual elements 220 engage and thus arrange the fiber introduction means 210 in a centered manner on the component. The bracing element 231 fixes the individual elements 220 both with respect to one another and on the component.

Furthermore, a heating device 270 can be provided on the fiber introduction means 210 in order to be able to appropriately control the temperature of the introduced fiber material 10.

Inside the backflow-preventing component there is firstly a fiber feed channel 240 and secondly a plastics feed channel 250. The fiber feed channel starts at the upper end of the fiber introduction means 210 and ends at a common exit channel 260, which then leads into the impregnation cavity of the impregnation component. The same applies to the plastics feed channel 250, which starts at a plastics feed 251 and likewise opens into the common exit channel 260.

In the exemplary embodiment in FIGS. 2 and 3, the fiber feed channel has a first channel section 241, which is formed by the section of the fiber feed channel formed by the fiber introduction means 210. This is followed by a second channel section 242 which is situated in the backflow-preventing component and is separate from the plastics feed channel 250. Lastly, there is a third channel section 243 within which the fiber material 10 and the plastics material 12 are guided together and which opens into the common exit channel 260.

The plastics feed channel 250 has a main section 252 and a secondary section 253. Both the main section 252 and the secondary section 253 lead to the common exit channel 260, meaning that in the third channel section 243 of the fiber feed channel 240 the plastics material is guided together with the fiber material in a common channel.

The inner surfaces of at least part of the fiber feed channel 240 should have a very low surface roughness and high wear resistance since the fiber material 10 comes into contact with the inner surfaces of the fiber feed channel 240. This relates in particular to the first and second channel sections 241 and 242, with the first channel section 241 in particular having a significantly smaller cross section than the second channel section 242.

Figure 4:
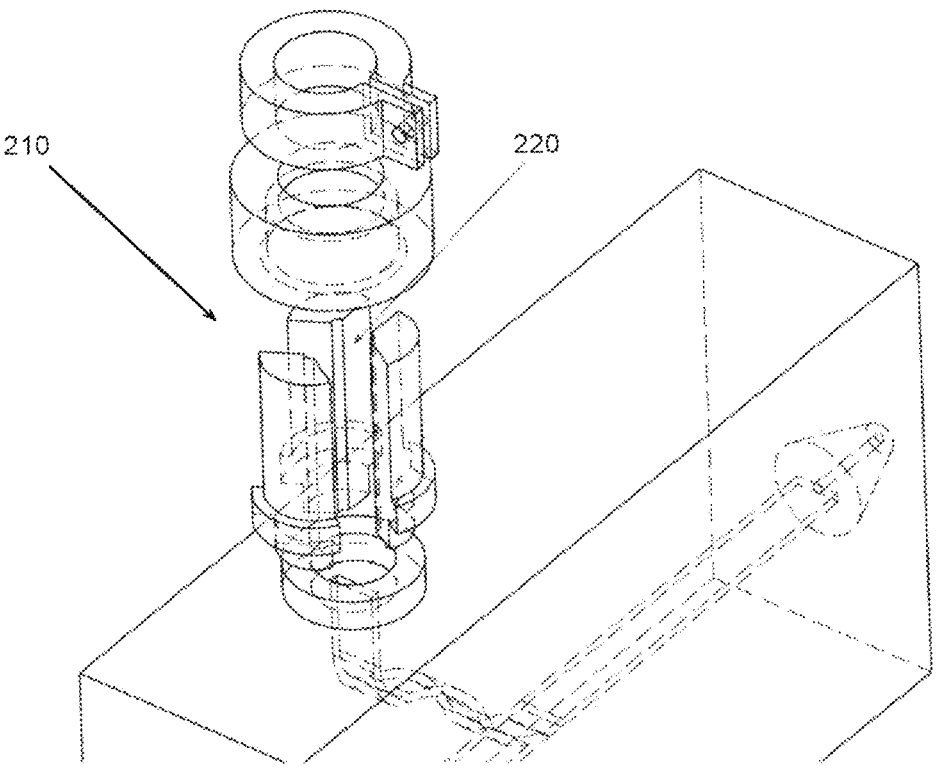
FIG. 4 shows an illustration of the fiber introduction means in a further embodiment.

FIG. 4 shows an exemplary embodiment in which the fiber introduction means 210 consists of a total of 3 individual elements 220. Each individual element forms an axial part of the inner surface of the first channel section 241 of the fiber feed channel 240, with the complete first channel section 241 of the fiber feed channel 240 then being formed in the assembled state. The first channel section 241 then preferably has a rectangular cross-sectional shape.

Figure 5:
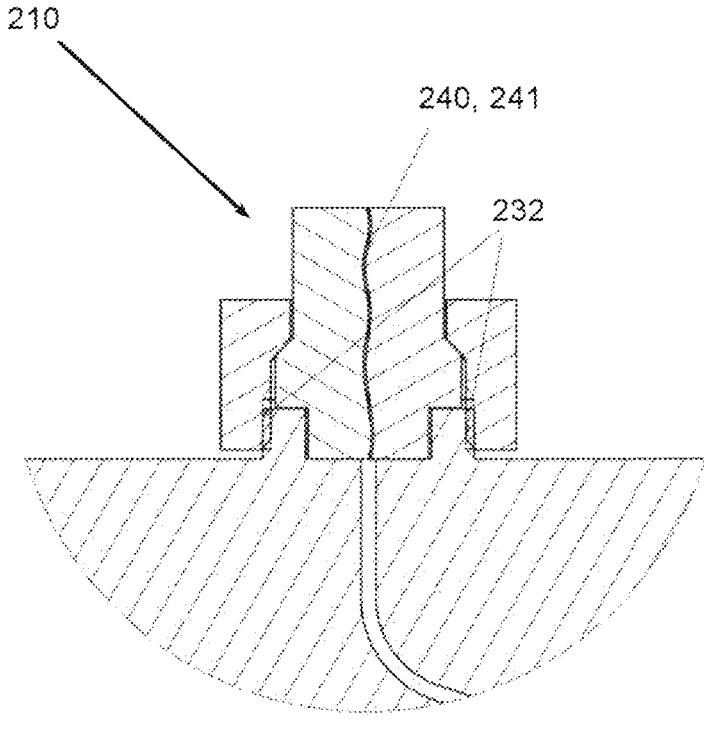
FIG. 5 shows an illustration of the fiber introduction means in a further embodiment.

In the exemplary embodiments of FIGS. 1 to 4, the first channel section 241 is linear and in particular has no curvatures or undulations. In the exemplary embodiment in FIG. 5, a fiber introduction means 210 is shown which, in the assembled state, exhibits an undulating first channel section 241 of the fiber feed channel.

Figure 6:
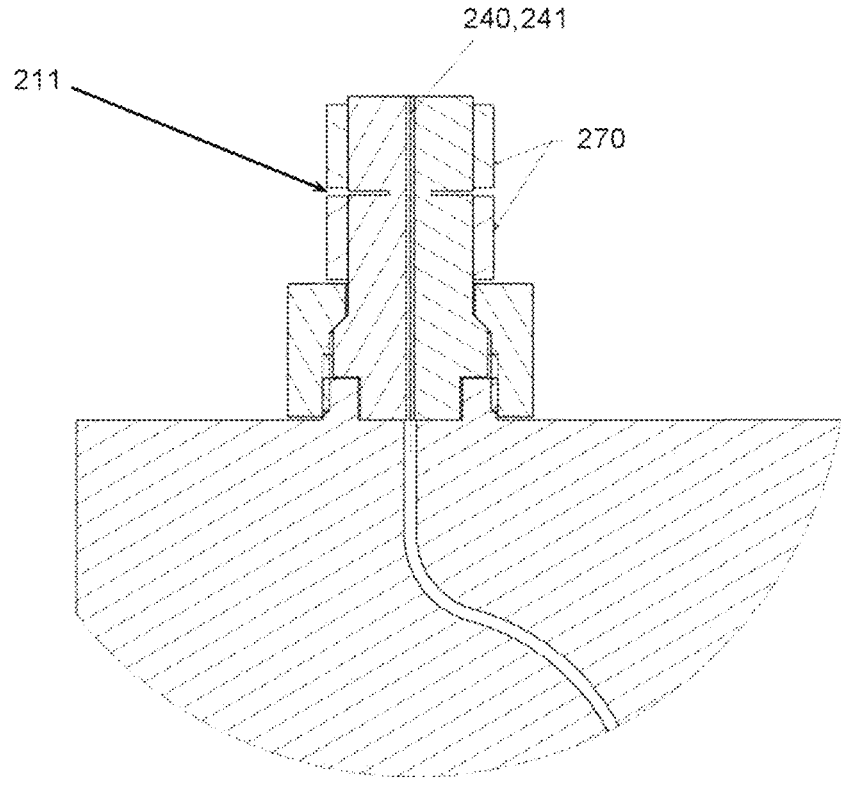
FIG. 6 shows an illustration of the fiber introduction means with temperature control elements.

FIG. 6 shows an enlarged illustration of the fiber introduction means 210, which is slotted in a region 211. As a result, two subregions of the fiber introduction means 210 are formed. Each subregion of the fiber introduction means can be provided with a separate temperature control element 270 in order thus to form different temperature control zones in the fiber introduction region. For example, the temperature of one zone can be deliberately set below the temperature of the liquid plastic in order to increase the viscosity of the liquid plastic and thereby prevent the liquid plastic from rising up and escaping.

Figure 7:
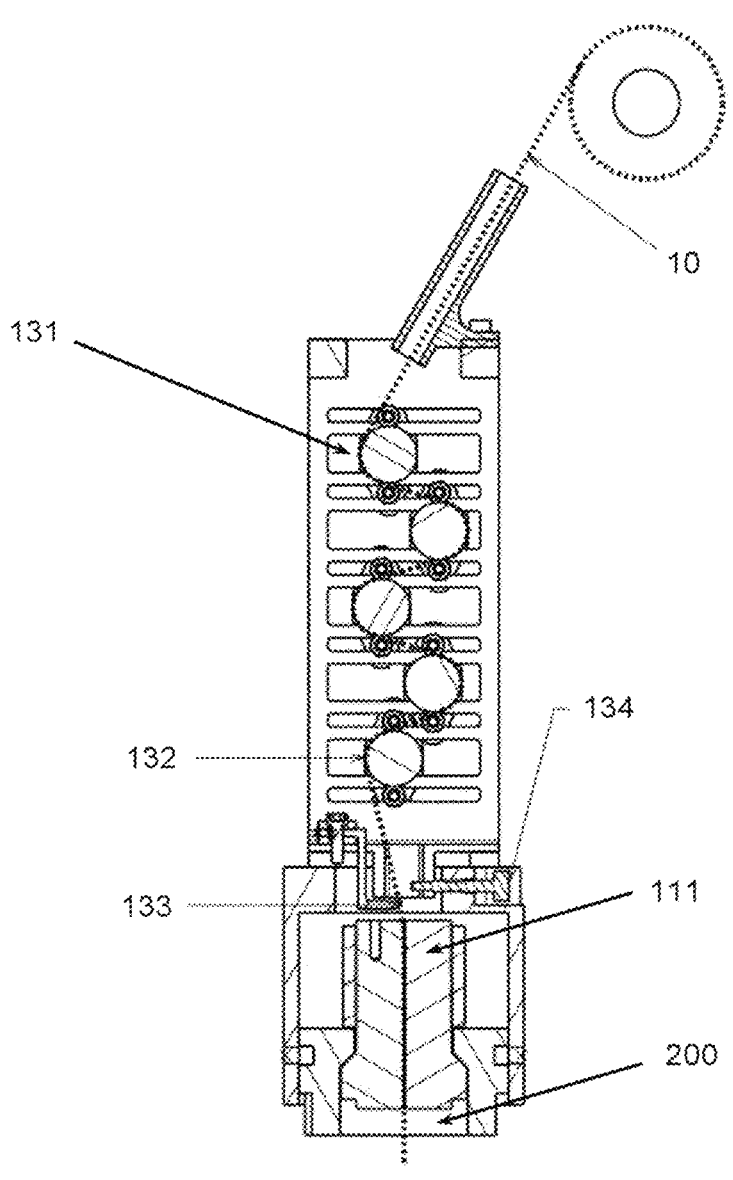
FIG. 7 shows an illustration of a fiber spreading means upstream of the fiber introduction means.

FIG. 7 shows a detailed illustration of the mounted spreading component 130 which is intended to spread open the fiber material 10 before it is introduced into the impregnation apparatus 100 or into the fiber introduction means 200. To this end, the fiber material 10 is deflected via a roller system 131, so that the fiber material is constantly changing its direction.

Arranged on one of the rollers can be an electrode in the form of a roller electrode 132, which interacts with a counter electrode 133 in such a way that a flow of current is brought about in the electrically conductive fiber material between the roller electrode 132 and the counter electrode 133. This flow of current results in heating of the fiber material and thus to temperature control. A sensor 134 can be provided in order to continuously record the temperature of the fiber material.

Figure 8:
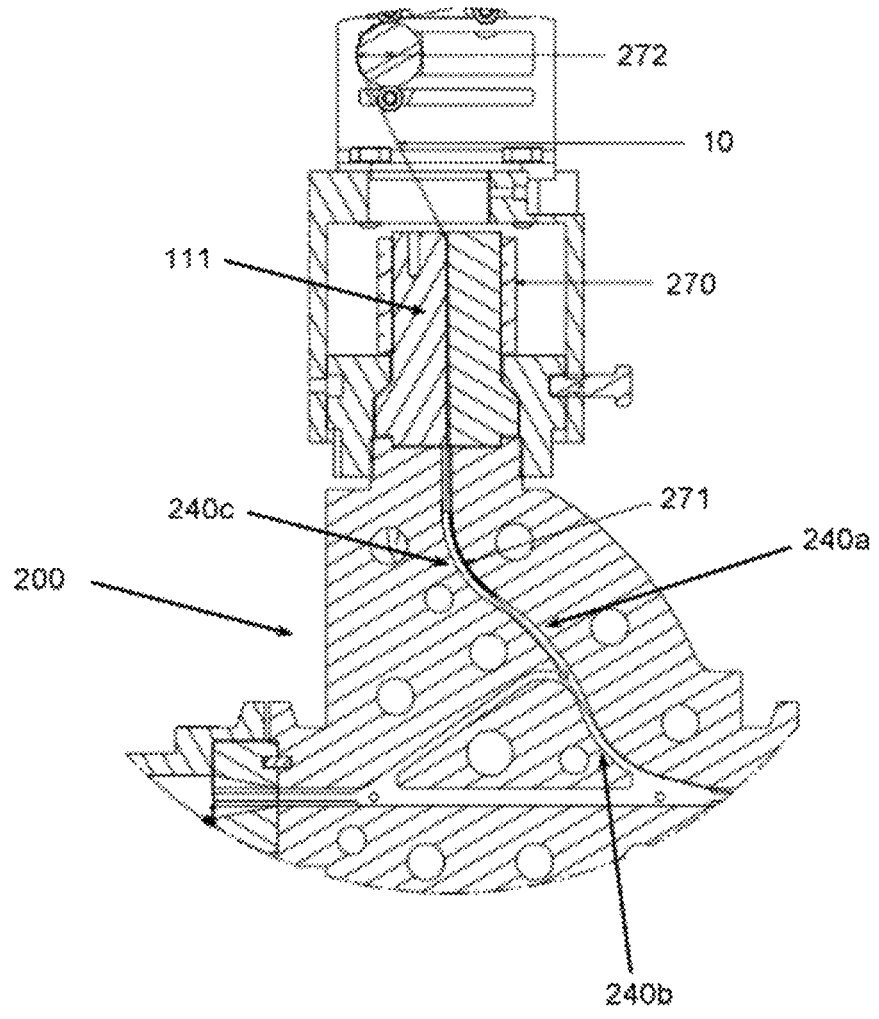
FIG. 8 shows an illustration of a further embodiment for temperature control.

FIG. 8 shows the channel guidance of the fiber feed channel and of the plastics feed channel of the backflow-preventing component 200. It can be seen that in the fiber feed channel 240 the course of the fiber feed channel runs in an S-shape, with a first curvature 240a and a second curvature 240b forming the S-shaped course of the fiber feed channel 240. Between the first curvature 240a and the second curvature 240b, the secondary section 253 of the plastics feed channel opens into the fiber feed channel 240. The first curvature 240a is selected in such a way that the fiber material 10 bears against a first inner side of the fiber feed channel 240 at which the secondary section 253 of the plastics feed channel also opens into the fiber feed channel 240. The fiber material is then guided from the first inner side at the first curvature 240a to the opposite second inner side of the second curvature 240b. As can be seen, the fiber material thus forms a backflow prevention means between the first curvature and the second curvature, since the plastics material would have to be pressed counter to the conveying direction between the fiber material and the first inner side along the first curvature.

In FIG. 8, an electrode 271 of the heating device 270 (not illustrated in this figure) is provided at a third curvature 240c and interacts with a counter electrode 272 to bring about a flow of current. In the process, the fiber material is heated in the region of the fiber material through which the current flows.

Figure 9:
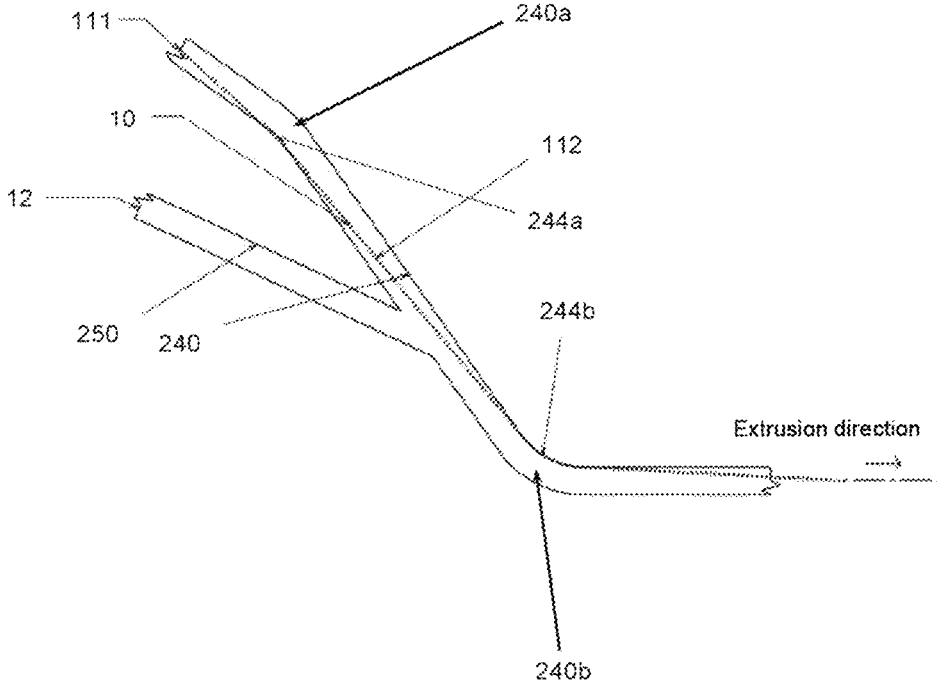
FIG. 9 shows a schematic illustration of a backflow prevention means by means of fiber material.

FIG. 9 shows a schematically simplified representation of the operating principle of the backflow prevention means which is brought about by the fiber material. The fiber material is pressed against the first inner side 244a of the first curvature 240a by the tensile force that is applied to the fiber material in the extrusion direction for the purpose of continuous conveying. The pressing force results from the tensile force for conveying the fiber material. Analogously, the fiber material is pressed against the second inner side 244b of the second curvature 240b. Since the plastics material now flows into the fiber feed channel 240 at the first inner side 244a between the first curvature 240a and the second curvature 240b, the path counter to the conveying direction remains blocked to the plastics material on account of the fiber material 10. The plastics material would have to overcome the force acting on the plastics material on account of the conveying of the fiber material and the pressing force of the fiber material on the first curvature 240a in order to rise up in the fiber feed channel. Although the fiber material is wetted with the plastics material, sufficient and at least partially continuous conveying of the fiber material prevents complete penetration until escape or until the backflow prevention means is overcome.

LIST OF REFERENCE SKINS

10 Fiber material
12 Plastics material
100 Impregnation apparatus
110 Backflow-preventing component
111 Fiber introduction means
112 Backflow prevention means
120 Impregnation component
121 Exit nozzle
122 Ultrasonic sonotrode
123 Impregnation cavity
124 Positioning elements
130 Spreading component
131 Roller system
132 Roller electrode
133 Counter electrode
134 Temperature sensor
200 Backflow-preventing component
210 Fiber introduction means
211 Slotted regions
220 Individual elements of the fiber introduction means
230 Closure device
231 Bracing element
232 Fine thread
240 Fiber feed channel
240a First curvature
240b Second curvature
240c Third curvature
241 First channel section
242 Second channel section
243 Third channel section
244a First inner side
244b Second inner side
250 Plastics feed channel
251 Plastics feed
252 Main section
253 Secondary section
260 Common exit channel
270 Heating device
5 271 Electrode of the heating device
272 Counter electrode of the heating device

The invention claimed is:

1. An impregnation apparatus for impregnating at least one quasi-continuous fiber material with a plastics material which has been melted at an appropriate process temperature, comprising:
at least one fiber feed channel with a fiber introduction means to feed the quasi-continuous fiber material to the impregnation apparatus,
at least one plastics feed channel with a plastics introduction means that is separate from the fiber introduction means to feed the plastics material to the impregnation apparatus separately from the fiber material, wherein the at least one fiber feed channel and the at least one plastics feed channel are separate at least in sections and open into a common impregnation cavity in order to impregnate the quasi-continuous fiber material with the fed and melted plastics material, and
a backflow-preventing region, in which the at least one fiber feed channel at least in sections has an S-shaped course which is formed by first and second curvatures with opposite directions of curvature, between which the at least one fiber feed channel is brought together with the at least one plastics feed channel, so that a common channel section is then formed,
wherein the first and second curvatures of the at least one fiber feed channel are configured adjacent to each other such that the fiber material at the first curvature is guided with contact along a first inner side of the at least one fiber feed channel and at the second curvature is guided with contact along a second inner side of the at least one fiber feed channel opposite the first inner side,
wherein the at least one plastics feed channel opens into the at least one fiber feed channel at the first inner side of the at least one fiber feed channel between the first and second curvatures in order to block the at least one fiber feed channel with the fiber material starting from a junction into the at least one fiber feed channel against the feed direction.

2. The impregnation apparatus as claimed claim 1 further comprising at least one heating device which is configured to control one or more of a temperature of the fiber material and a temperature of the plastics material.

3. The impregnation apparatus as claimed in claim 2, wherein the at least one heating device has an electrode arranged in the at least one fiber feed channel at a position at which the fiber material is guided with contact along the electrode, wherein the at least one heating device is configured to generate a flow of current in an electrically conductive fiber material by means of the electrode.

4. The impregnation apparatus as claimed in claim 1, wherein a width of the at least one fiber feed channel essentially corresponds to a width of the fiber material.

5. The impregnation apparatus as claimed in claim 1, wherein the fiber introduction means is a component which is separate from a remainder of the impregnation apparatus and configured for detachable arrangement on the impregnation apparatus and which has at least two individual elements that are capable of being brought from an open state into a closed state and that in the closed state form at least a portion of the at least one fiber feed channel.

6. The impregnation apparatus as claimed in claim 5, wherein a parting plane of the individual elements of the fiber introduction means lies in an axis of the portion of the at least one fiber feed channel formed by the fiber introduction means.

7. The impregnation apparatus as claimed in claim 5, further comprising a closure device configured for one or more of a form-fitting and a force-fitting arrangement of the individual elements of the fiber introduction means on the impregnation apparatus.

8. The impregnation apparatus as claimed in claim 5, wherein a cross-sectional area of the portion formed by the fiber introduction means as a first section of the at least one fiber feed channel is smaller than a second section of the at least one fiber feed channel that directly adjoins the fiber introduction means.

9. The impregnation apparatus as claimed in claim 5, wherein the portion formed by the fiber introduction means is essentially linear, undulating, or double-S-shaped in course or wherein the first section formed by the fiber introduction means has at least one curvature.

10. The impregnation apparatus as claimed in claim 1, wherein the backflow-preventing region is arranged upstream of the impregnation cavity in a conveying direction of the fiber material.

11. The impregnation apparatus as claimed in claim 10, wherein the backflow-preventing region is provided in a backflow-preventing component which is detachably fastened or fastenable to an impregnation component having the common impregnation cavity.

12. A backflow-preventing component for use in an impregnation apparatus for impregnating a quasi-continuous fiber material with a plastics material, the backflow-preventing component comprising:

at least one fiber feed channel with a fiber introduction means to feed the quasi-continuous fiber material, at least one plastics feed channel with a plastics introduction means that is separate from the fiber introduction means to feed the plastics material separately from the fiber material, wherein the at least one fiber feed channel and the at least one plastics feed channel are separate at least in sections, and a backflow-preventing region, in which the fiber feed channel at least in sections has an S-shaped course which is formed by first and second curvatures with opposite directions of curvature, between which the at least one fiber feed channel is brought together with the at least one plastics feed channel, so that a common channel section is then formed, wherein the first and second curvatures of the at least one fiber feed channel are configured adjacent to each other such that the fiber material at the first curvature is guided with contact along a first inner side of the at least one fiber feed channel and at the second curvature is guided with contact along a second inner side of the at least one fiber feed channel opposite the first inner side, wherein the at least one plastics feed channel opens into the at least one fiber feed channel at the first inner side of the at least one fiber feed channel between the first and second curvatures in order to block the at least one fiber feed channel with the fiber material starting from a junction into the at least one fiber feed channel against the feed direction.

13. A method for impregnating at least one quasi-continuous fiber material with a plastics material, the method comprising the following steps:

providing the impregnation apparatus of claim 1, introducing the quasi-continuous fiber material into the provided impregnation apparatus, and continuously feeding the plastics material and the quasi-continuous fiber material into the common impregnation cavity of the impregnation apparatus to impregnate the quasi-continuous fiber material with the plastics material, wherein in the backflow-preventing region in the provided impregnation apparatus the fiber material is guided through the S-shaped course of the at least one fiber feed channel, wherein between the first and second curvatures of the S-shaped course the plastics material is pressed through a plastics feed channel opening therebetween into the common channel section.

* * * * *